(12) United States Patent
Hu et al.

(10) Patent No.: US 12,045,706 B2
(45) Date of Patent: *Jul. 23, 2024

(54) BOT BUILDER DIALOG MAP

(71) Applicant: salesforce.com, inc., San Francisco, CA (US)

(72) Inventors: George Hu, San Francisco, CA (US); Arvind Krishnan, San Francisco, CA (US); Justin Maguire, III, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,690

(22) Filed: May 17, 2022

(65) Prior Publication Data
US 2022/0335268 A1    Oct. 20, 2022

Related U.S. Application Data

(63) Continuation of application No. 15/885,396, filed on Jan. 31, 2018, now Pat. No. 11,334,785.

(60) Provisional application No. 62/581,568, filed on Nov. 3, 2017.

(51) Int. Cl.
| | | |
|---|---|---|
| G06N 5/043 | (2023.01) | |
| G06F 16/901 | (2019.01) | |
| G06N 3/006 | (2023.01) | |
| H04L 51/02 | (2022.01) | |
| G06F 3/0482 | (2013.01) | |

(52) U.S. Cl.
CPC ......... *G06N 3/006* (2013.01); *G06F 16/9027* (2019.01); *G06N 5/043* (2013.01); *H04L 51/02* (2013.01); *G06F 3/0482* (2013.01)

(58) Field of Classification Search
CPC .... G06N 5/00; G06N 5/02–047; G06N 20/00; G06F 40/35
USPC ....................................................... 706/45–61
See application file for complete search history.

(56) References Cited

U.S. PATENT DOCUMENTS

| | | | |
|---|---|---|---|
| 6,904,143 B1 * | 6/2005 | Peterson | H04M 3/42221 |
| | | | 379/265.06 |
| 8,041,588 B2 | 10/2011 | Gilbert et al. | |
| 9,082,406 B2 | 7/2015 | Shen et al. | |
| 9,870,296 B1 * | 1/2018 | Parenti | G06F 11/3485 |
| 10,303,773 B2 * | 5/2019 | Curtis | G06F 40/35 |
| 10,965,573 B1 | 3/2021 | Mooneyham et al. | |
| 11,334,785 B2 | 5/2022 | Hu et al. | |
| 11,729,120 B2 * | 8/2023 | Wu | G06F 40/216 |
| | | | 709/206 |
| 2012/0041903 A1 | 2/2012 | Beilby et al. | |

(Continued)

FOREIGN PATENT DOCUMENTS

WO    WO 2010078614 A1    7/2010

*Primary Examiner* — Daniel T Pellett
*Assistant Examiner* — Leah M Feitl
(74) *Attorney, Agent, or Firm* — Sterne, Kessler, Goldstein & Fox P.L.L.C.

(57) ABSTRACT

This disclosure relates to tools to facilitate the configuration of interactive agents, sometimes referred to as bots, chatbots, virtual robots, or talkbots. Specifically, the disclosure relates to the provision of a map view visualization of an interactive agent. The map view can display a complexity indicator or usage percentage for each dialog and provide an easy mechanism for creation of new dialogs, actions, parameters, rules, and logic.

20 Claims, 14 Drawing Sheets

(56) References Cited

U.S. PATENT DOCUMENTS

| | | | |
|---|---|---|---|
| 2013/0054299 A1* | 2/2013 | Deshpande | G06Q 10/06 705/7.26 |
| 2014/0002483 A1 | 1/2014 | Hong et al. | |
| 2014/0250195 A1 | 9/2014 | Capper et al. | |
| 2015/0160811 A1 | 6/2015 | Shah | |
| 2015/0350437 A1* | 12/2015 | Vymenets | G06Q 30/016 379/265.03 |
| 2015/0350443 A1 | 12/2015 | Kumar et al. | |
| 2016/0212073 A1* | 7/2016 | Kulkarni | H04L 51/04 |
| 2016/0352658 A1 | 12/2016 | Capper et al. | |
| 2017/0255888 A1* | 9/2017 | McCord | G06Q 10/0633 |
| 2017/0364843 A1* | 12/2017 | Haligowski | G06Q 10/0633 |
| 2018/0129484 A1* | 5/2018 | Kannan | G06F 3/0482 |
| 2018/0321830 A1 | 11/2018 | Calhoun et al. | |
| 2018/0330252 A1* | 11/2018 | Sawano | G06F 16/2428 |
| 2019/0138879 A1 | 5/2019 | Hu et al. | |

* cited by examiner

BOT BUILDER DIALOG MAP

CROSS REFERENCE TO RELATED APPLICATIONS

This application is a continuation of U.S. patent application Ser. No. 15/885,396, titled "Bot Builder Dialog Map," filed Jan. 31, 2018, which claims the benefit of U.S. Provisional Patent Application 62/581,568, titled "Bot Builder Dialog Map," filed Nov. 3, 2017, which are both incorporated by reference herein in their entirety.

BACKGROUND

An interactive agent, sometimes referred to as a bot, chatbot, virtual robot, talkbot, etc. is a computer program that simulates human conversation through voice commands, text messages, or both. An interactive agent can provide a convenient means for businesses to serve their customers, answer questions, and provide access to integrated back-end system functionalities. Where customers would previously navigate through menus on a webpage, send an email, call a business on the telephone, or visit in person, customers now communicate with interactive agents to more efficiently and effectively solve their problems. Where businesses would fund and maintain extensive, expensive, and potentially inefficient call centers or handle customer inquiries internally, businesses now configure interactive agents to quickly and competently handle these often repetitive tasks.

Interactive agents have become increasingly mainstreamed, occupying devices in homes and businesses, integrating with social networks, and dispersing across the Internet because they provide access to information and advanced, real-time functionality in a conversational, comfortable, familiar, and pseudo-human fashion. However, managing the interactions between interactive agents and customers requires a business to consider and configure appropriate parameters, rules, logic, and structures giving life to the interactive agent.

Accordingly, a need exists to provide business with tools to simply and efficiently configure, organize, and debug these interactive agents.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
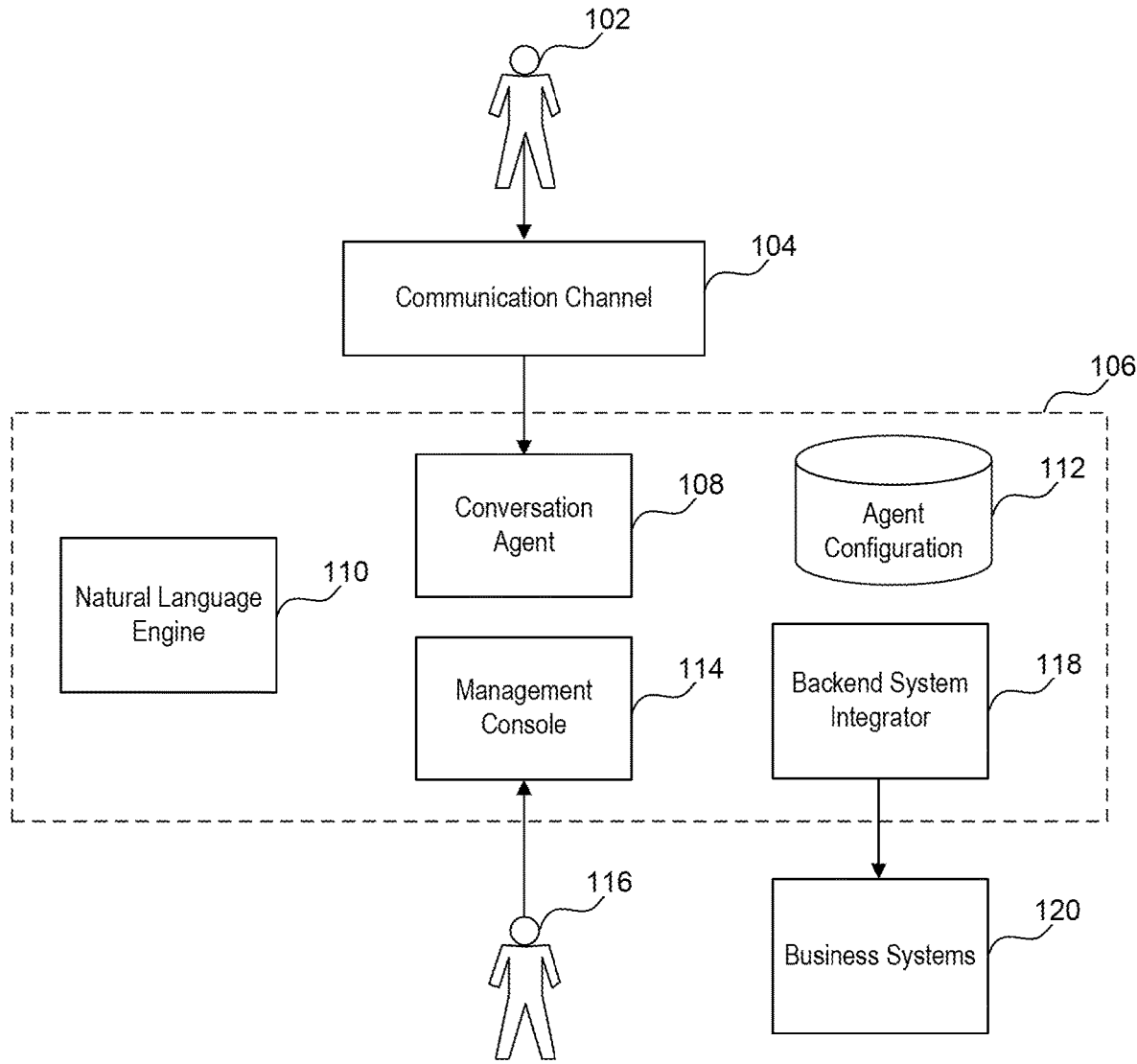
FIG. 1 is a block diagram of an interactive agent architecture, according to some embodiments.
Figure 2A:
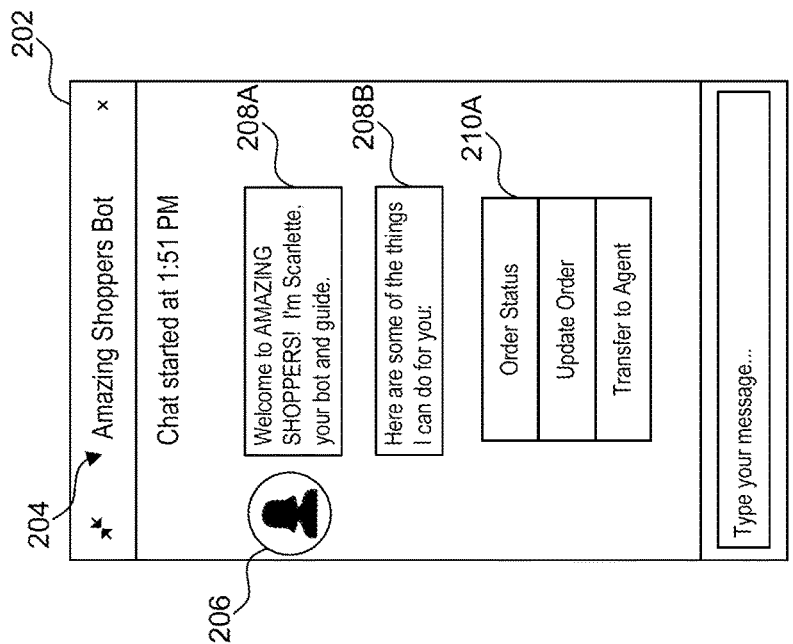
FIGS. 2A-2D are screen displays of an interactive agent interface, according to some embodiments.
Figure 2B:
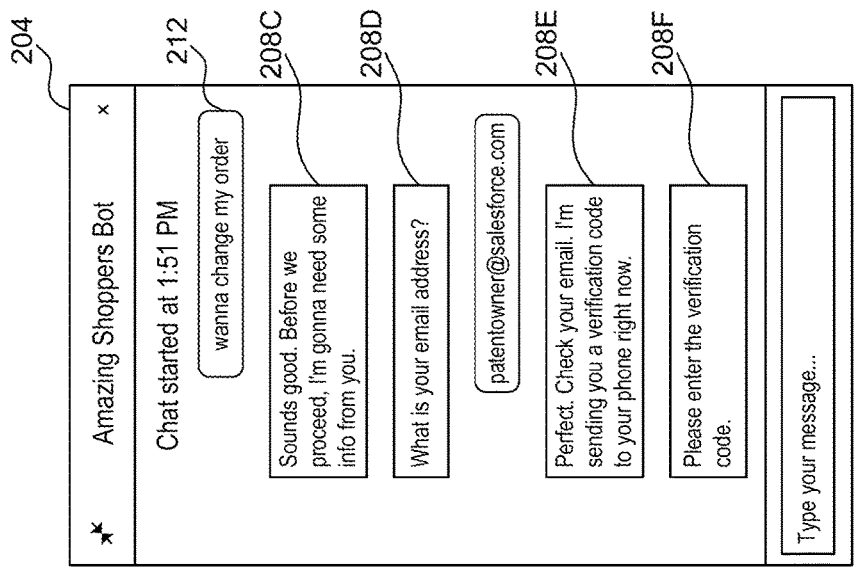
Figure 2C:
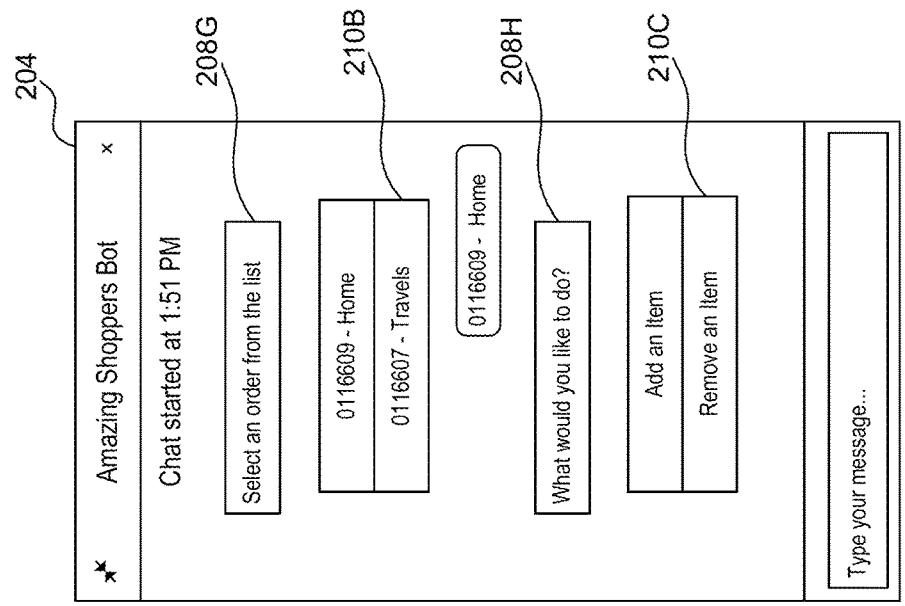
Figure 2D:
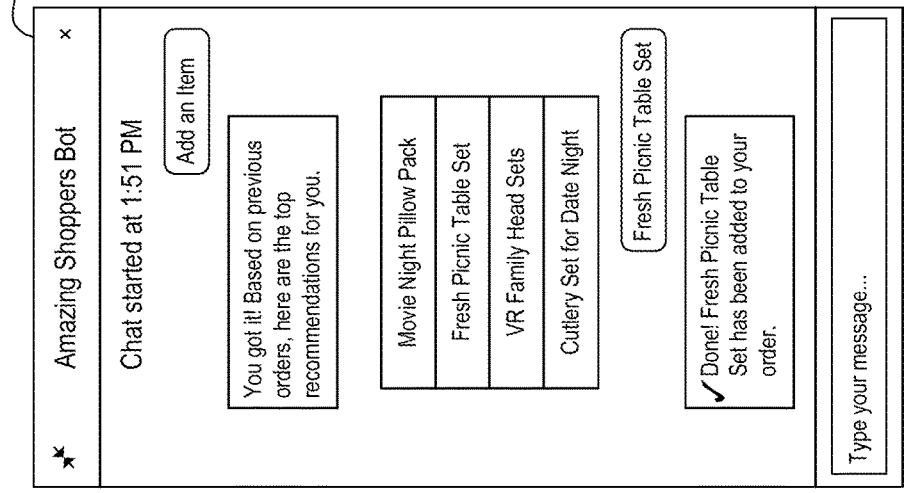

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, these descriptions are merely for convenience, and these actions result from computing devices, processors, controllers, or other devices executing the firmware, software, routines, and/or instructions. Further, any implementation variations may be carried out by a general purpose computer, as described below.

Any reference to the term "module" shall be understood to include at least one of software, firmware, and hardware (such as one or more circuit, microchip, or device, or any combination thereof) or any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Provided herein are system, apparatus, device, method and/or computer program product embodiments, and/or combinations and sub-combinations thereof, for configuring interactive agents. An interactive agent, also known as a bot, chatbot, virtual robot, talkbot, etc., will be understood by one skilled in the relevant arts to be a simulation of human conversation through voice commands, text messages, or both. In an embodiment, an interactive agent can provide a convenient mechanism by which businesses can service customers' needs quickly and efficiently.

However, a business must design flows, dialogs, rules, logic, and structures to empower an interactive agent to meet the business's customers' unique and varied needs. A business can build these parameters into an interactive agent configuration, which personalizes the interactive agent, indicates a scope of its available actions, and harnesses natural language processing tools including machine learning and training.

In an embodiment, a business specifies an interactive agent configuration utilizing a suitable builder, framework, tool, or interface. In an embodiment, this framework or builder is a cross-channel development tool that can deploy bots to various chat applications, e.g., Salesforce Live Agent, Facebook, Google, Apple, and more. In an embodiment, such a framework utilizes conversational block elements, referred to hereafter as dialogs, to configure, control, and organize interactions between an interactive agent and customers. In an embodiment, a dialog is a cluster of actions that the interactive agent can perform and intents or goals of a customer. A dialog may include predetermined messages that the interactive agent sends to the customer during their conversation. The dialog may also specify inputs to be received from a user, any back-end verifications, processes, or programs to integrate, any data to be retrieved from resources available to the interactive agent through an API, and any other suitable functionalities to further support the interactions between an interactive agent and customers.

For instance, if a clothing retailer provides customer service using an interactive agent, the retailer would build dialogs unique to the retail industry. One exemplary dialog could be a dialog to receive and process a customer's order. In this example, the dialog could consist of messages directed to the customer, e.g., "Hello, welcome to the store. How can I help you today?" The dialog could also anticipate input from the user, e.g., "What would you like to buy today? (1) shoes; (2) hats; (3) shirts;" and then receive and recognize the customer's response to the question. The dialog could subsequently interact with the invoicing system, placing the specific order once verified by the customer. Another dialog could retrieve past orders from an internal billing system, display the orders for customers in a coherent fashion, allow searching, answer questions about past orders, etc.

In an embodiment, an interactive-agent framework also utilizes flows. In such an embodiment, a flow could represent a series of one or more dialogs to execute in a particular order. Continuing the exemplary retailer example, a flow could represent a sequence of dialogs unique to the retail industry that the customer can undertake upon launching the interactive agent. For instance, the customer could check an order status, then update the order or cancel it, etc., and then exit the interactive agent. These dialogs, each consisting of one or more actions, would all be considered part of a single flow, and the transitions between the dialogs would need to be configured.

One skilled in the relevant arts will appreciate that building appropriate dialogs and flows can be a time-consuming, resource-intensive process. Debugging problems in an interactive agent adds further difficulties. One effective tool to simply these tasks is to provide a visualization of the interactive agent configuration, such as a map view. The map view can be a tree structure, wherein each node of the tree represents a dialog in the flow. The branches between nodes represent transitions between dialogs. Furthermore, the map view can provide complexity indicators for each dialog/node or a usage percentage drawn from data tracking runtime statistics from past instantiations of the interactive agent. In an embodiment, the map view can further allow direct editing of the interactive agent through interactions with the dialog map. These features will now be discussed with respect to the corresponding figures.

Interactive Agents

FIG. 1 is a block diagram of an interactive agent architecture 100, according to some embodiments. Interactive agent architecture 100 may include customer 102, communication channel 104, interactive agent 106, conversation agent 108, natural language engine 110, agent configuration 112, management console 114, business agent 116, backend system integrator 118, and business systems 120.

In an embodiment, customer 102 uses communication channel 104 to interface with interactive agent 106. Customer 102 can be an individual (i.e., a human being) or group of such individuals. In an embodiment, customer 102 interacts with interactive agent 106 in order to accomplish a task, gather information, or complete other goals. For example, customer 102 could aim to order a pizza from a pizzeria, receive suggestions about particular goods or services from a retailer, obtain customer support for a technical problem, view a weather forecast on a home device, hear the news, schedule a meeting, make travel plans, receive a restaurant recommendation, or any other of a myriad of suitable tasks.

Communication channel 104 provides a method by which a human can interact with interactive agent 106. In an embodiment, communications between customer 102 and interactive agent 106 via communication channel 104 can be text-based, speech- or sound-based, or occur in any other suitable communication medium. For example, communication channel 104 could be Messenger, Slack, Chatterbox, WhatsApp, Email, Skype, etc. Communication channel 104 could transpire through verbal exchanges instead of text messages, for example, in speaking interactions with Alexa, Google Home, HomePod, etc. Communication channel 104 can exchange packets with interactive agent 106 via a network, which includes any or all of a LAN, WAN, the Internet, or other public network, or communication channel 104 and interactive agent 106 coexist on or within the same device or workstation.

Interactive agent 106 may include conversation agent 108, natural language engine 110, agent configuration 112, management console 114, and backend system integrator 118. Such an embodiment of interactive agent 106 provides efficiency advantages to a business over conventional methods of processing customer requests/questions, such as utilizing a call center or other form of human labor or intelligence. Interactive agent 106 advances a paradigm of human-computer interaction utilizing natural language, pre-scripted flows, and tailored dialogs.

Conversation agent 108 is a bot, chatbot, virtual robot, talkbot, etc. that simulates human conversation through voice, text, other form of suitable communication, or a combination thereof. In exemplary embodiments, conversation agent 108 can service customers' inquiries, answer customers' questions, and address customer needs. Conversation agent 108 may respond to customers using pre-defined text strings, ask relevant questions, collect data from associated data sources seamlessly, run scripts or executables, and transition customers through or among the dialogs.

In an embodiment, an interactive agent 106 utilizes natural language engine 110, which leverages natural language processing to decipher and interpret text or speech received from customer 102 via communication channel 104. One skilled in the arts will understand that such natural language processing aims to determine the intent or intents of the customers. Machine learning and machine training can be harnessed to better understand and gauge customers' intents over time.

Agent configuration 112 stores a description of the behaviors and functionalities available to conversation agent 108. In an embodiment, agent configuration 112 stores natural language parameters, flows, rules, logic, scripts, dialogs, and variables that guide the behavior of interactive agent 106.

In an embodiment, management console 114 provides a mechanism to facilitate the configuration, design, implementation, and release of interactive agent 106 and to update agent configuration 112. Management console 114 can provide a visualization of interactive agent 106 and agent configuration 112. In an embodiment, management console 114 can include one or more servers processing web-based traffic and HTTP or HTTPS request methods as received from a web browser on a mobile device or computer workstation. In an embodiment, management console 114 serves appropriate HTML web pages or other suitable viewable format to business agent 116. Business agent 116 can be an owner, employee, agent of, representative of, etc. of any business, company, individual, etc. that deploys interactive agent 106. In an embodiment, business agent 116 is no affiliated with any business, but rather is an individual acting in an individual capacity.

Backend system integrator 118 interacts with any relevant business systems 120 in order to provide additional functionality to interactive agent 106. For example, relevant business systems 120 could be ordering, invoice, shipping, or personnel systems, or any other suitable system. In an embodiment, backend system integrator 118 could interact with relevant business systems 120 using an application programming interface or other subroutine definition or protocol. This integration can occur seamlessly and quickly from the perspective of customer 102 and occurs as part of customer 102's interactions with interactive agent 106.

FIGS. 2A-2D are screen displays of interactive agent interface 200, according to some embodiments. Interface 200 may reflect a specific instance of conversation agent 108 described above in FIG. 1. In an embodiment, interface 200 may include: window 202, title 204, avatar 206, dialogs 208, input 210, and text input 212. For exemplary purposes, FIGS. 2A-2D reflect an "Amazing Shoppers Bot," however, this is just one exemplary embodiment. Interactive agent 106 could service any number of a myriad of subjects, customers, businesses, etc.

In an embodiment, window 202 frames messages transmitted in SMS, MIMS, or other suitable format. In an alternative embodiment, window 202 receives voice messages, employs speech recognition software, and verbally relays the contents of window 202. In an embodiment, window 202 displays title 204, avatar 206, dialogs 208, input 210, and text input 212. Title 204 describes the subject matter addressed by interactive agent 106. Avatar 206 can be a logo, picture, photo, or other visual representation of the personality of interactive agent 106.

Dialogs 208 are the conversational block elements that guide, frame, describe, and coordinate interactions between interactive agent 106 and customer 102. Dialogs 208 may include textual or verbal messages that conversation agent 108 outputs to customer 102. Dialogs 208 may also specify inputs to be received from customer 102, back-end verifications, processes, or programs to integrate, any data to be retrieved from resources available to the interactive agent through an API, and any other suitable functionalities to customer 102.

Input 210 and text input 212 can be information received from customer 102. Input 210 can be any of a number of forms of input such as a checkbox, radio button, multiselect, yes/no, etc. Input can also be received as text, strings, or other character data as text input 212. In processing text input 212, interactive agent 106 can apply natural language processing to ascertain the intents of customer 102 across a variety of lingual constructs, grammatical forms, sentence structures, etc.

Bot Builder Map View

Figure 3:
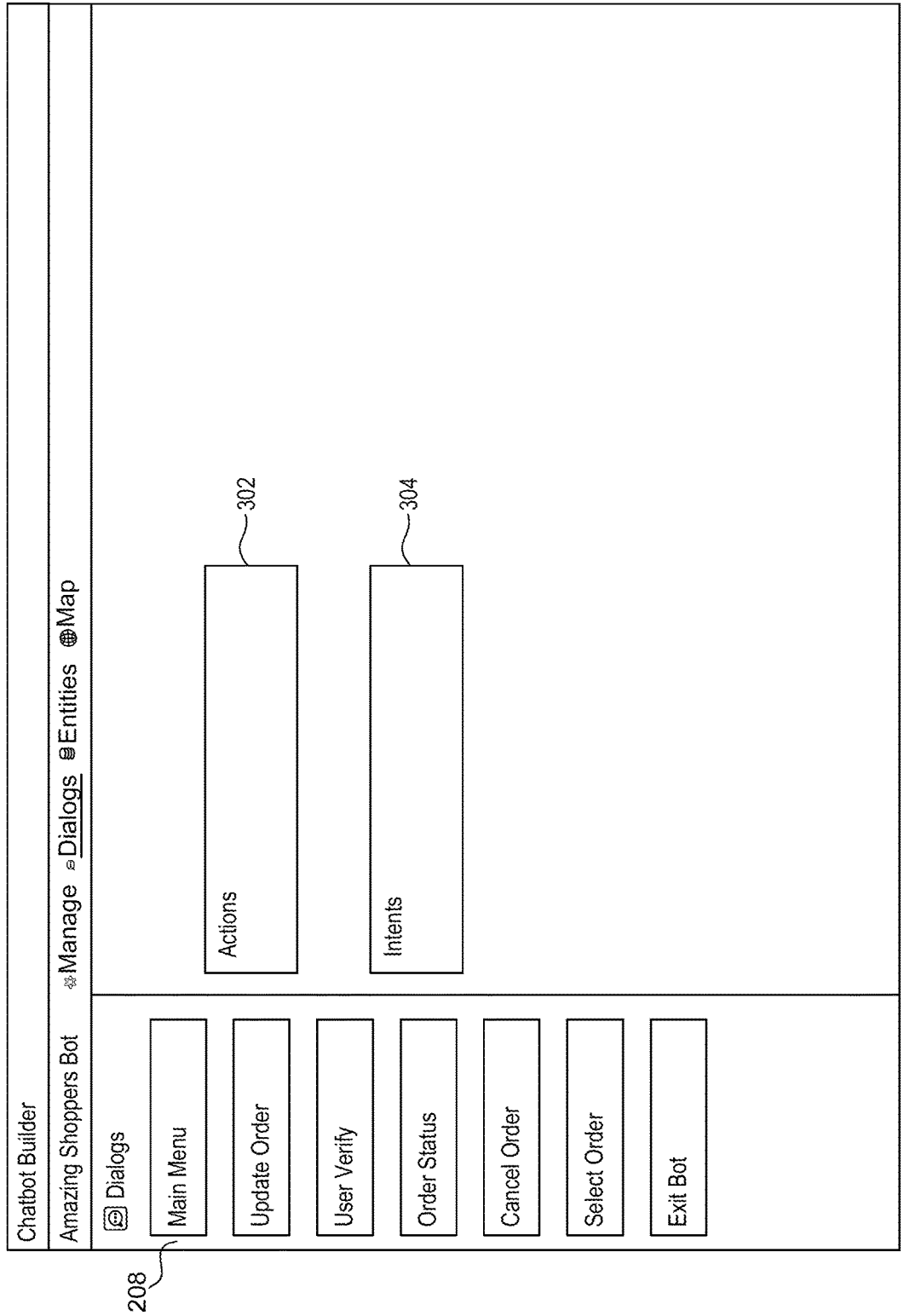
FIG. 3 is a screen display of an interactive agent configuration tool, according to some embodiments.

FIG. 3 is a screen display of an interactive agent configuration tool 300, according to some embodiments. Interactive agent configuration tool 300 may include: actions 302 and intents 304, as well as a description or listing of dialogs 208 described above in FIG. 2.

Actions 302 are configured by business agent 116 via configuration tool 300. Actions 302 specify the behavior of interactive agent 106. In an embodiment, actions 302 are responses or messages in the form of pre-written text or character strings, questions that interactive agent 106 should ask also in textual form, scripts and executables to run, and other process rules. Actions 302 further describe the relationships between dialogs 208, provide an indication of the order in which dialogs 208 and actions 302 transpire, and the flow that interactive agent 106 transitions through.

Intents 304 are activities that a given customer 102 aims to accomplish. Intents 304 feed into natural language engine 110 and utilize natural language processing to garner intents 304 from text, voice, and other inputs passed through communication channel 104.

Usage Percentage on Map View

Figure 4A:
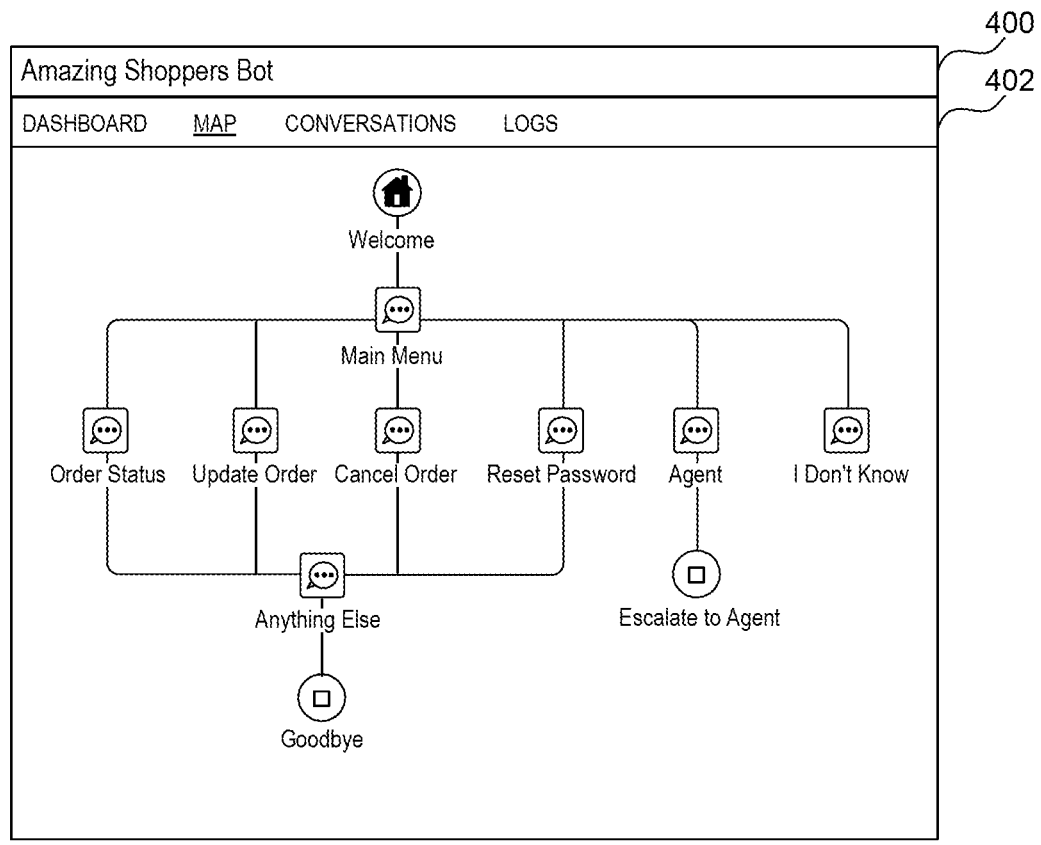
FIG. 4A is a screen display of a map view in an interactive agent management system, according to some embodiments.

FIG. 4A is a screen display of a map view in an interactive agent management system 400, according to some embodiments. Interactive agent management system 400 provides map view 402. Map view 402 is a visual representation of agent configuration 112. Map view 402 represents as nodes each dialog in dialogs 208. The branches, or the lines between these nodes, can be the transitions or flows between dialogs 208. In an embodiment, these transitions could occur chronologically or based on user inputs.

Figure 4B:
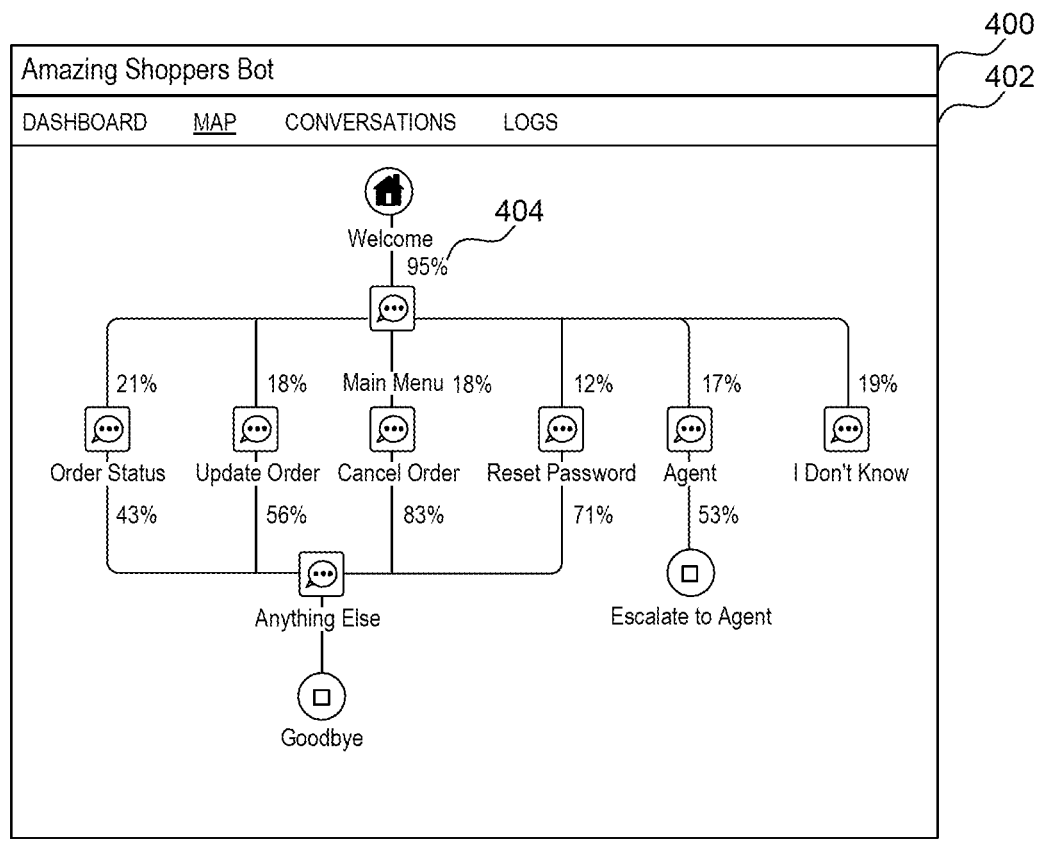
FIG. 4B is a screen display of a map view including a usage percentage in an interactive agent management system, according to some embodiments.

FIG. 4B is a screen display of a map view including a usage percentage in an interactive agent management system 400, according to some embodiments. Percentage 404 can be a ratio reflecting a quantity of users that reached a particular dialog. In an embodiment, interactive agent management system 400 determines this quantity of customers by pulling from historical logs descriptions of past runtime results. In an embodiment, Interactive agent management system 400 then determines a suitable percentage 404 by comparing the quantity of customers entering that particular dialog to the total quantity of customers that used interactive agent 106. In an alternate embodiment, the usage percentage would be determined relative only to the number of customers that reached the preceding dialog in the flow.

For instance, in exemplary FIG. 4B, 95% of users reached the "Main Menu" dialog (implying that 5% exited before even making it that far). Subsequently, of that 95% of users, 21% entered the "Order Status" dialog, either through a menu-based flow selection or a natural language entry that conversation agent 108 determined should be routed to the "Order Status" dialog. Such information is useful to business agent 116 because they can visualize past interactions with interactive agent 106. Visually viewing the data can help business agent 116 understand actual, real-word interactions occurring between customer 102 and interactive agent 106. Furthermore, this information aids the debugging of problems arising during the course of those interactions. Each dialog in dialogs 208 could include a clickable link to the data used to generate percentage 404.

Figure 5:
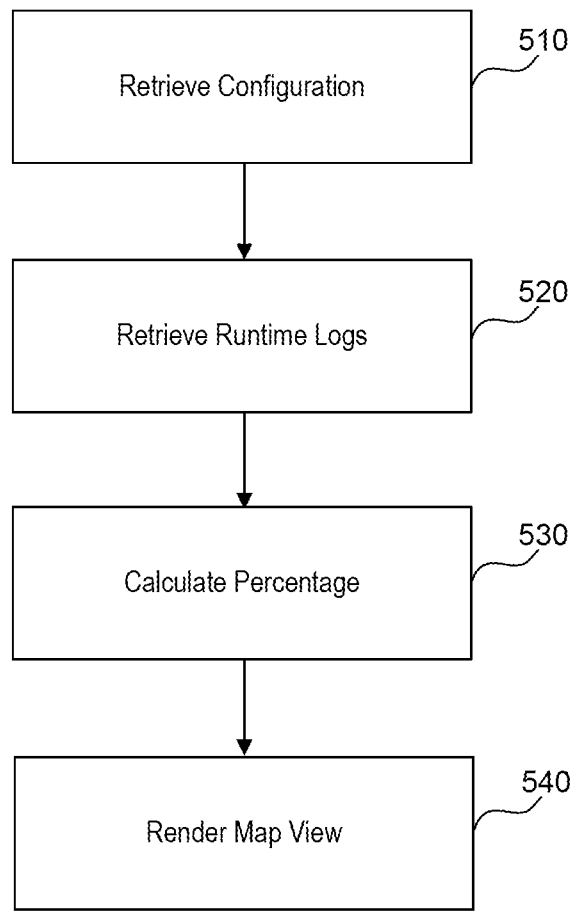
FIG. 5 is a flowchart illustrating a process for calculating and displaying a usage percentage for a dialog in a map view, according to some embodiments.

FIG. 5 is a flowchart illustrating method 500 for calculating and displaying the usage percentage for a dialog in a map view, according to some embodiments. Method 500 shall be described with reference to interactive agent management system 400 in FIG. 4B.

Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

In 510, interactive agent 106 receives a configuration representing interactive agent 106. Such a configuration could have been previously configured by business agent 116 via management console 114 and stored in agent configuration 112, as described above in FIG. 1.

In 520, interactive agent 106 receives runtime logs indicative of past instantiations of conversation agent 108. Such logs could be stored textually or in databases and could record interactions between customer 102 and conversation agent 108 such as inputs, error messages, dialogs executed, etc. The format of such a log would be understood by one skilled in the relevant arts.

In 530, interactive agent 106 calculates a usage percentage from the runtime logs. In an embodiment this usage percentage could be a ratio between a number of total executions of the interactive agent and a number of executions of a particular dialog. In an alternate embodiment, this usage percentage could be a ratio between a number of executions of a particular dialog and a number of executions of the dialog preceding the particular dialog. In an embodiment, a separate usage percentage would be displayed for each of dialogs 208 displayed in map view 402.

In 540, interactive agent 106 renders map view 402 including the percentages generated in 530. In an embodiment, map view 402 could include each of the percentages calculated. In an embodiment, map view 402 could also include a clickable link to view the logs comprising that percentage, i.e., the logs used in 520 to calculate the percentage.

Dialog Actions Count in Map View

Figure 4C:
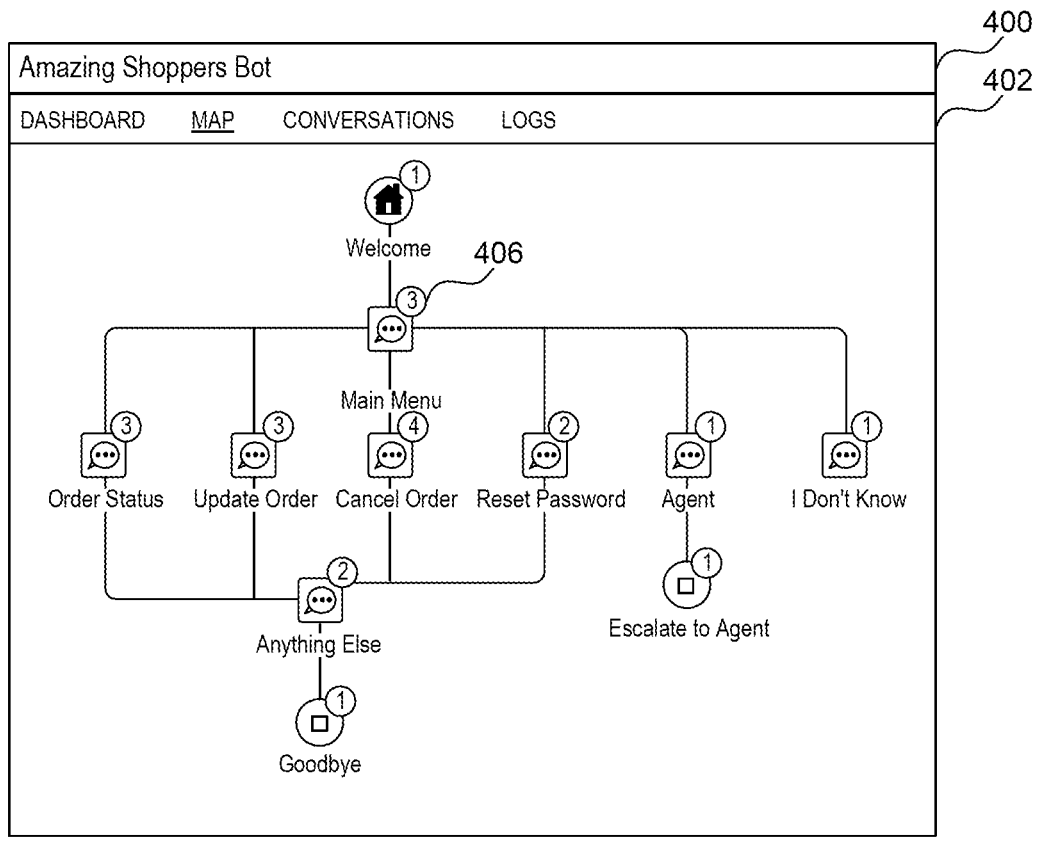
FIG. 4C is a screen display of a map view including a complexity indicator in an interactive agent management system, according to some embodiments.

FIG. 4C is a screen display of a map view including a complexity indicator in an interactive agent management system 400, according to some embodiments. Complexity indicator 406 can reflect the complexity of a dialog in dialogs 208. Complexity in this context can be defined as the number of actions transpiring within a dialog in dialogs 208. Actions within dialogs 208 can include, for example, outputting messages by conversation agent 108 to customer 102, accepting various forms of input from customer 102, executing internal or external programs, processes, or functions via backend system integrator 118, and any other function that interactive agent 106 is capable of performing.

By examining the complexity of dialogs 208, business agent 116 can learn more about the design, architecture, and functions of interactive agent 106. In such an embodiment, the number of actions in dialogs 208 appears to business agent 116 in map view 402 without the need to manually zoom in and out of each dialog node.

For example, in FIG. 4C, three actions occur within the "Main Menu" dialog, four actions occur within the "Cancel Order" dialog, etc. Business agent 116 can determine visually the information from map view 402 and then fashion improvements based on the complexity indicator. For instance, if one dialog is disproportionately complicated, the dialog could potentially be split into multiple dialogs. Or, if a dialog includes a large number of actions, perhaps the dialog itself can be optimized or streamlined by reducing the number of actions associated with the dialog.

Figure 6:
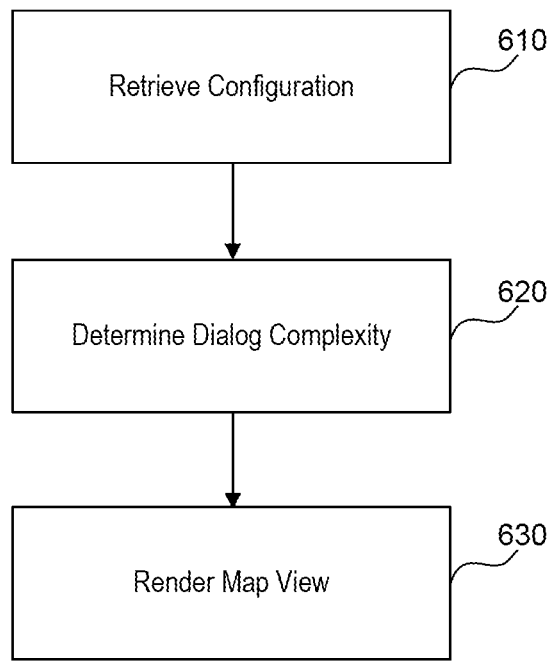
FIG. 6 is a flowchart illustrating a process for calculating and displaying a complexity indicator for a dialog in a map view, according to some embodiments.

FIG. 6 is a flowchart illustrating method 600 for calculating and displaying complexity indicator for a dialog in a map view, according to some embodiments. Method 600 shall be described with reference to interactive agent management system 400 in FIG. 4C.

In 610, interactive agent 106 receives a configuration representing interactive agent 106. Such a configuration could have been previously configured by business agent 116 via management console 114 and stored in agent configuration 112, as described above in FIG. 1.

In 620, interactive agent 106 determines complexity indicator 406. In an embodiment, 620 determines complexity indicator 406 by counting the number of actions included in dialogs 208 contained in agent configuration 112. In an embodiment, complexity indicator 406 is calculated for each dialog in dialogs 208.

In 630, interactive agent 106 renders the map view including the complexity indicators for each node/dialog generated in 620. In an embodiment, map view 402 could include each of the complexity indicators. In an embodiment, map view 402 could also include a clickable link to view the actions comprising that complexity indicators, i.e., the actions used in 620 to determine the complexity indicator.

Auto Dialog Logic Creation from Map View

Figure 4D:
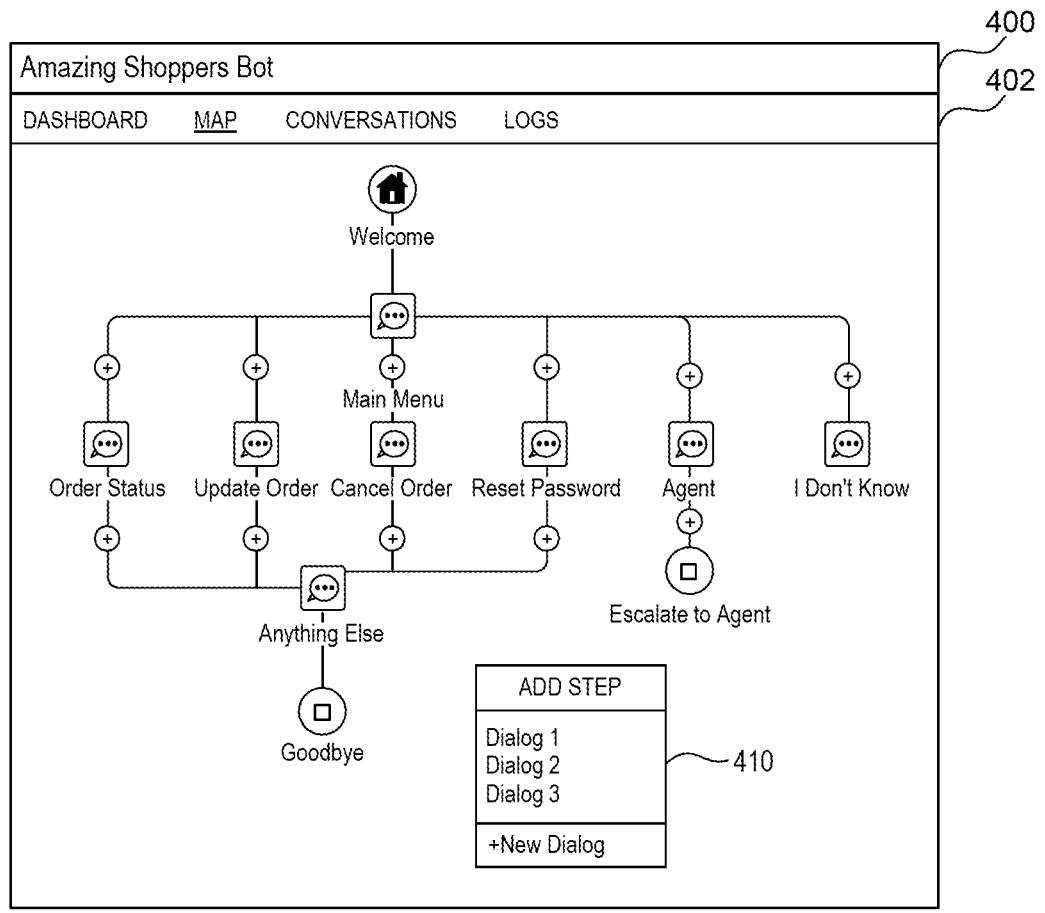
FIG. 4D is a screen display of a map view with editing capabilities in an interactive agent management system, according to some embodiments.

FIG. 4D is a screen display of a map view with editing capabilities in an interactive agent management system 400, according to some embodiments. Editing capabilities can include the opportunity for business agent 116 to visually arrange, create, modify, update, delete, or otherwise change dialogs 208 within agent configuration 112. Thus, instead of building dialogs 208 using text, business agent 116 can add to agent configuration 112 directly in map view 402. Add-step module 410 can instantiate when a business agent 116 adds a new dialog.

Figure 7:
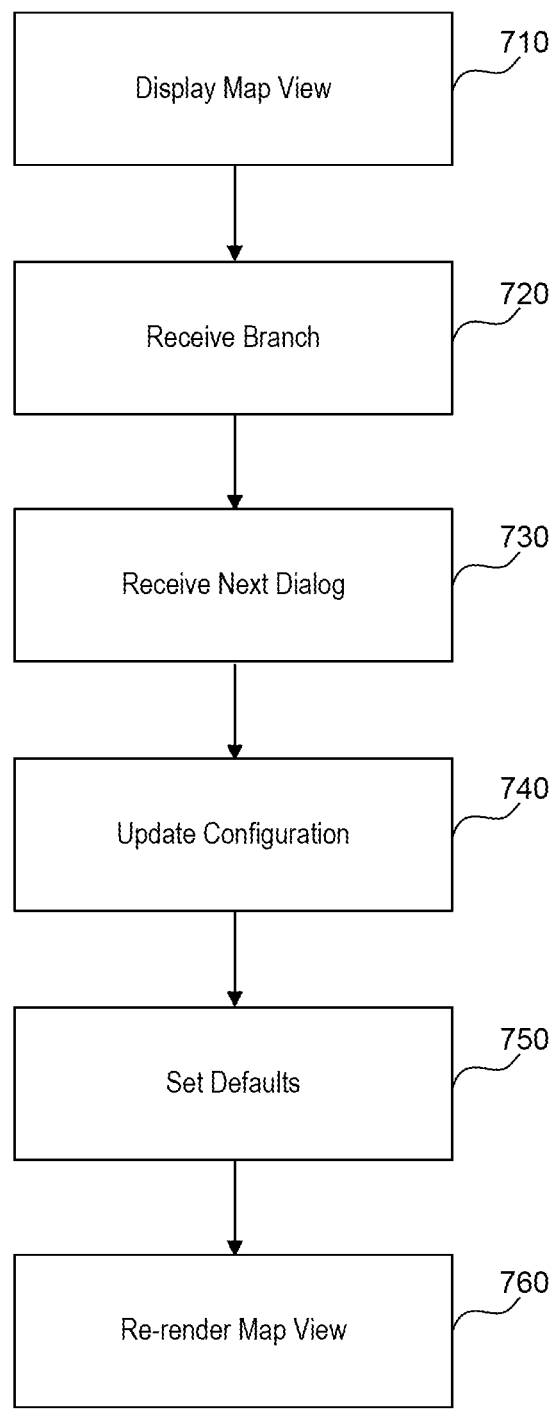
FIG. 7 is a flowchart illustrating a process for adding a dialog from a map view, according to some embodiments.

FIG. 7 is a flowchart illustrating method 700 for adding a dialog from a map view, according to some embodiments. Method 700 shall be described with reference to interactive agent management system 400 in FIG. 4D.

In 710, interactive agent 106 displays map view 402. 710 builds map view 402 based upon the information stored in agent configuration 112. In an embodiment, map view 402 includes a usage percentage as indicated in FIG. 4B and/or a complexity indicator as indicated in FIG. 4C.

In 720, interactive agent 106 receives a branch to which a new dialog will be added. In an embodiment, the branch received can be selected by business agent 116 in map view 402.

In 730, interactive agent receives the name of the new dialog added to the branch determined in 720. In an embodiment, the new dialog can be entered into add-step-module 410.

In 740, interactive agent 106 updates the configuration, such as agent configuration 112, with the information received in 720 and 730. In an embodiment, this information could include a name for the new dialog (received in 730) and the location of the new dialog within any flows. Neighboring dialogs would need to be updated similarly in accordance with the new flow. In 750, interactive agent 106 sets default logic and rules for the newly created dialog. In 760, interactive agent 106 re-renders the map view, which includes the newly created dialog.

Figure 8:
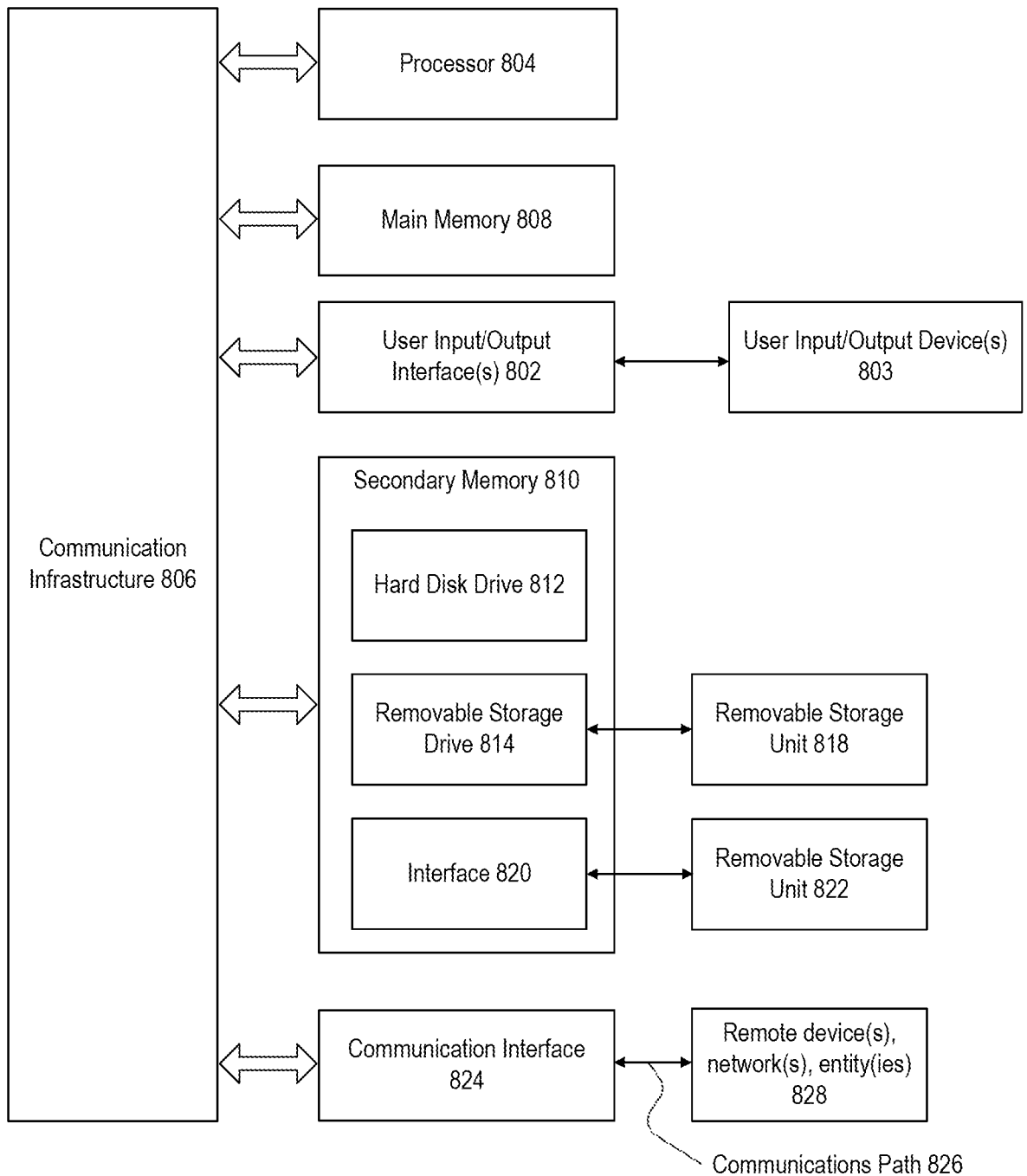
FIG. 8 illustrates a computer system, according to exemplary embodiments of the present disclosure.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818.

Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for managing a conversation agent, comprising:
 providing, using a server, instances of the conversation agent to a plurality of customer devices for interaction in a flow over a communication channel, wherein the flow comprises one or more steps, and wherein a first step in the one or more steps comprises a first action that retrieves data from a resource through an application programming interface and a second action that verifies the retrieved data;
 storing, in a database, runtime logs of customer interactions with the conversation agent of the plurality of customer devices at the one or more steps, wherein the runtime logs of customer interactions indicate a quantity of customers entering the one or more steps;
 generating data for rendering, by one or more display devices, a map view of a configuration of the conversation agent, the map view comprising: (1) a complexity indicator for each of the one or more steps that indicates a number of actions configured to occur within each of the one or more steps and (2) a visual representation of usage of the one or more steps based on the runtime logs of customer interactions, wherein the visual representation of usage reflects a ratio between a total number of executions of the conversation agent and the quantity of customers entering the one or more steps, and wherein a node in the map view corresponds to the first step; and
 responsive to a user selection of the node in the map view, displaying the runtime logs of customer interactions associated with the node including a record of a first execution of the first action and a second record of a second execution of the second action.

2. The method of claim 1, wherein the runtime logs of customer interactions further comprises inputs and error messages.

3. The method of claim 1, wherein the one or more steps further comprise pre-defined strings presented to the plurality of customer devices via the communication channel.

4. The method of claim 1, wherein the communication channel facilitates an exchange of text messages.

5. The method of claim 1, wherein the communication channel facilitates a verbal exchange of a message.

6. The method of claim 1, wherein the map view is a tree structure.

7. The method of claim 1, further comprising:
responsive to an interaction with the node in the map view, editing the configuration of the conversation agent.

8. A system, comprising:
a memory; and
at least one processor coupled to the memory and configured to:
provide, using a server, instances of a conversation agent to a plurality of customer devices for interaction in a flow over a communication channel, wherein the flow comprises one or more steps, and wherein a first step in the one or more steps comprises a first action that retrieves data from a resource through an application programming interface and a second action that verifies the retrieved data;
store, in a database, runtime logs of customer interactions with the conversation agent of the plurality of customer devices at the one or more steps, wherein the runtime logs of customer interactions indicate a quantity of customers entering the one or more steps;
generate data for rendering, by one or more display devices, a map view of a configuration of the conversation agent, the map view comprising: (1) a complexity indicator for each of the one or more steps that indicates a number of actions configured to occur within each of the one or more steps and (2) a visual representation of usage of the one or more steps based on the runtime logs of customer interactions, wherein the visual representation of usage reflects a ratio between a total number of executions of the conversation agent and the quantity of customers entering the one or more steps, and wherein a node in the map view corresponds to first step; and
responsive to a user selection of the node in the map view, display the runtime logs of customer interactions associated with the node including a record of a first execution of the first action and a second record of a second execution of the second action.

9. The system of claim 8, wherein the runtime logs of customer interactions further comprises inputs and error messages.

10. The system of claim 8, wherein the one or more steps further comprise pre-defined strings presented to the plurality of customer devices via the communication channel.

11. The system of claim 8, wherein the communication channel facilitates an exchange of text messages.

12. The system of claim 8, wherein the communication channel facilitates a verbal exchange of a message.

13. The system of claim 8, wherein the map view is a tree structure.

14. The system of claim 8, further comprising:
responsive to an interaction with the node in the map view, editing the configuration of the conversation agent.

15. A non-transitory computer-readable device having instructions stored thereon that, when executed by at least one computing device, causes the at least one computing device to perform operations comprising:
providing, using a server, instances of a conversation agent to a plurality of customer devices for interaction in a flow over a communication channel, wherein the flow comprises one or more steps, and wherein a first step in the one or more steps comprises a first action that retrieves data from a resource through an application programming interface and a second action that verifies the retrieved data;
storing, in a database, runtime logs of customer interactions with the conversation agent of the plurality of customer devices at the one or more steps, wherein the runtime logs of customer interactions indicate a quantity of customers entering the one or more steps;
generating data for rendering, by one or more display devices, a map view of a configuration of the conversation agent, the map view comprising: (1) a complexity indicator for each of the one or more steps that indicates a number of actions configured to occur within each of the one or more steps and (2) a visual representation of usage of the one or more steps based on the runtime logs of customer interactions, wherein the visual representation of usage reflects a ratio between a total number of executions of the conversation agent and the quantity of customers entering the one or more steps, and wherein a node in the map view corresponds to the first step; and
responsive to a user selection of the node in the map view, displaying the runtime logs of customer interactions associated with the node including a record of a first execution of the first action and a second record of a second execution of the second action.

16. The non-transitory computer-readable device of claim 15, wherein the runtime logs of customer interactions further comprises inputs and error messages.

17. The non-transitory computer-readable device of claim 15, wherein the one or more steps further comprise pre-defined strings presented to the plurality of customer devices via the communication channel.

18. The non-transitory computer-readable device of claim 15, wherein the communication channel facilitates an exchange of text messages.

19. The non-transitory computer-readable device of claim 15, wherein the communication channel facilitates a verbal exchange of a message.

20. The non-transitory computer-readable device of claim 15, wherein the map view is a tree structure.

* * * * *